United States Patent
Ariga et al.

(10) Patent No.: US 12,087,912 B2
(45) Date of Patent: Sep. 10, 2024

(54) SECONDARY BATTERY

(71) Applicant: HONDA MOTOR CO., LTD., Tokyo (JP)

(72) Inventors: Toshiyuki Ariga, Saitama (JP); Takuya Taniuchi, Saitama (JP); Masahiro Ohta, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 286 days.

(21) Appl. No.: 17/645,995

(22) Filed: Dec. 26, 2021

(65) Prior Publication Data

US 2022/0231344 A1 Jul. 21, 2022

(30) Foreign Application Priority Data

Jan. 15, 2021 (JP) .................................. 2021-005124

(51) Int. Cl.
  H01M 10/0585 (2010.01)
  H01M 4/02 (2006.01)
  H01M 4/80 (2006.01)
  H01M 10/0525 (2010.01)

(52) U.S. Cl.
  CPC ......... H01M 10/0585 (2013.01); H01M 4/80 (2013.01); H01M 10/0525 (2013.01); *H01M 2004/027* (2013.01); *H01M 2004/028* (2013.01)

(58) Field of Classification Search
  CPC . H01M 2300/0065; H01M 2300/0068; H01M 2300/0071–0077
  See application file for complete search history.

(56) References Cited

U.S. PATENT DOCUMENTS

| | | | | |
|---|---|---|---|---|
| 2012/0328941 | A1* | 12/2012 | Hosoe | H01M 10/399 29/874 |
| 2015/0017550 | A1* | 1/2015 | Nishimura | H01M 4/808 429/231.95 |
| 2017/0338522 | A1* | 11/2017 | Hu | H01M 4/381 |
| 2020/0212450 | A1* | 7/2020 | Shimizu | H01M 4/74 |

FOREIGN PATENT DOCUMENTS

| | | | |
|---|---|---|---|
| JP | 2004158222 A | * | 6/2004 |
| JP | 2008226666 A | | 9/2008 |
| JP | 2017103146 A | * | 6/2017 |

OTHER PUBLICATIONS

JP2017103146A_Machine Translation (Year: 2017).*
JP2004158222A_Machine translation (Year: 2004).*

* cited by examiner

*Primary Examiner* — Haroon S. Sheikh
*Assistant Examiner* — Aryana Y. Ortiz
(74) *Attorney, Agent, or Firm* — CKC & Partners Co., LLC

(57) ABSTRACT

To secure ionic conductivity by improving the adhesion between an electrode material mixture and a solid electrolyte and suppressing electrodeposition of lithium. A lithium ion secondary battery (100) includes a positive electrode including an electrode material mixture that fills pores of a metal porous body constituting an electrode current collector, a first solid electrolyte layer including a solid electrolyte that fills pores of a resin porous body, and a negative electrode including an electrode material mixture that fills pores of a metal porous body constituting an electrode current collector. The positive electrode and the negative electrode are alternately stacked with the first solid electrolyte layer provided therebetween.

3 Claims, 4 Drawing Sheets

SECONDARY BATTERY

This application is based on and claims the benefit of priority from Japanese Patent Application No. 2021-005124, filed on 15 Jan. 2021, the content of which is incorporated herein by reference.

BACKGROUND OF THE INVENTION

Field of the Invention

The present invention relates to a secondary battery.

Related Art

Conventionally, lithium ion secondary batteries have been widely used as secondary batteries having a high energy density. In the case of a solid-state battery where the electrolyte is solid, the battery has a cell structure in which a solid electrolyte is present between a positive electrode and a negative electrode. A plurality of the cells are stacked on one another to construct a solid lithium ion secondary battery.

In the case of a solid-state battery, sufficient adhesion is required between an electrode material mixture containing a positive electrode active material or a negative electrode active material and a solid electrolyte from the viewpoint of maintaining the ionic conductivity of lithium ions or the like. If the adhesion decreases due to repeated expansion and contraction during charging and discharging, electrodeposition of lithium occurs and ionic conductivity decreases.

In this regard, for example, Patent Document 1 discloses a structure in which both sides of a solid electrolyte layer having a dense structure are sandwiched between porous solid electrolytes, and pores of the solid electrolyte are filled with an electrode material mixture, and thereby the electrode material mixture and the solid electrolyte are integrated.

Patent Document 1: Japanese Unexamined Patent Application, Publication No. 2008-226666

SUMMARY OF THE INVENTION

However, in Patent Document 1, the adhesion between the porous solid electrolyte and the electrode material mixture and the solid electrolyte is insufficient, and further improvement is required.

In response to the above issue, it is an object of the present invention to improve the adhesion between an electrode material, mixture and a solid electrolyte, to suppress electrodeposition of lithium due to a decrease in the adhesion, and to secure ionic conductivity.

The inventors have found that the above issue can be solved by using an electrode including an electrode material mixture that fills pores of a metal porous body as each of a positive electrode or a negative electrode and a solid electrolyte layer including a solid electrolyte that fills pores of a resin porous body and stacking them, and have completed the present invention. That is, the present invention provides the following.

(1) A first aspect of the present invention relates to a secondary battery, including a positive electrode including an electrode material mixture that fills pores of a metal porous body constituting an electrode current collector, a first solid electrolyte layer including a solid electrolyte that fills pores of a resin porous body, and a negative electrode including an electrode material mixture that fills pores of a metal porous body constituting an electrode current collector. The positive electrode and the negative electrode are alternately stacked with the first solid electrolyte layer provided therebetween.

According to the invention of the first aspect, by stacking the electrodes of metal, porous bodies and the solid electrolyte layer of a resin porous body, the surface irregularities of the porous bodies, which face and contact each other, cause intertwinement, which increases the adhesion between the layers. Thus, it is possible to follow volume changes during charging and discharging, and thereby suppress electrodeposition of lithium.

(2) In a second aspect of the present invention according to the first aspect, the electrode current collector has an end portion having an electrode material mixture non-filled region that is not filled with the electrode material mixture. The first solid electrolyte layer has an end portion having an electrolyte non-filled region that is not filled with the solid electrolyte. The electrode material mixture non-filled region and the electrolyte non-filled region face each other and are intertwined with each other.

According to the invention of the second aspect, the electrode material mixture non-filled region and the electrolyte non-filled region face each other and are intertwined with each other in the end portion of the electrode current collector, and thereby the surface irregularities of the porous bodies, which face and contact each other, cause further intertwinement, which further increases the adhesion between the layers. Thus, it is possible to follow volume changes during charging and discharging, and thereby suppress electrodeposition of lithium.

(3) In a third aspect of the present invention according to the second aspect, the electrode material mixture non-filled region and the electrolyte non-filled region are pressure-bonded.

According to the invention of the third aspect, by pressure-bonding the electrode material mixture non-filled region and the electrolyte non-filled region, the bonding strength and followability can be further increased, and the adhesion is increased. Thus, it is possible to follow volume changes during charging and discharging, and thereby suppress electrodeposition of lithium.

(4) In a fourth aspect of the present invention according to any one of the first aspect to the third aspect, an electrode material mixture layer and a second solid electrolyte layer are stacked in a planar shape in the pores of the metal porous body. The first solid electrolyte layer and the second solid electrolyte layer are stacked facing each other.

According to the invention of the fourth aspect, by stacking the electrode material mixture layer and the solid electrolyte layer in a planer shape in the pores of the metal porous body, the adhesion between the electrode material mixture layer and the solid electrolyte layer can be improved. Thus, it is possible to further follow volume changes during charging and discharging, and thereby suppress electrodeposition of lithium.

DETAILED DESCRIPTION OF THE INVENTION

Embodiments of the present invention will now be described with reference to the drawings. The present invention is not limited to the following embodiments, in the following embodiments, a solid-state lithium ion battery will be used as an example, but the present invention can be applied to batteries other than lithium ion batteries.

First Embodiment

<Overall Structure of Lithium Ion Secondary Battery>

Figure 1:
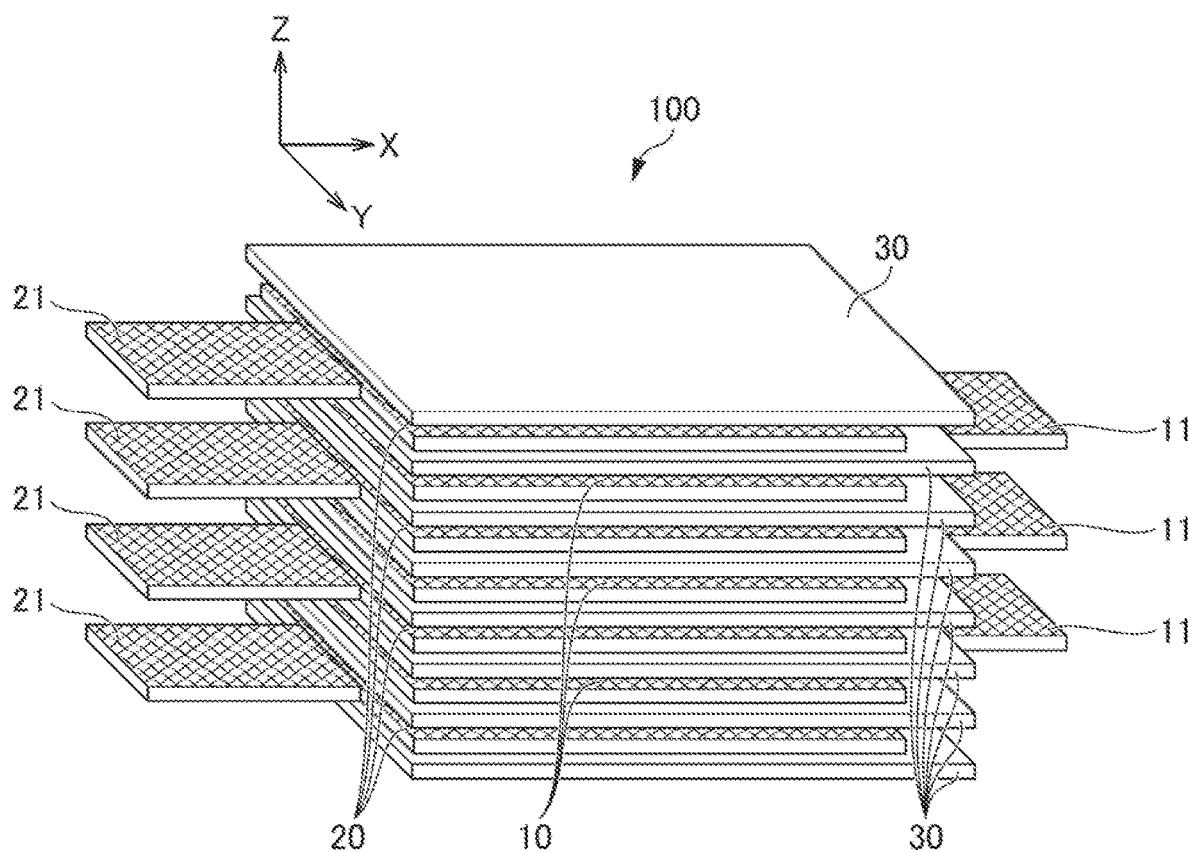
FIG. 1 is a perspective view of a secondary battery according to a first embodiment of the present invention.

As shown in FIG. 1, a lithium ion secondary battery 100 according to the present embodiment is a solid-state battery, and is an electrode stack in which a positive electrode 10 and a negative electrode 20 are alternately arranged with a solid electrolyte layer 30 provided therebetween. A positive electrode tab 11 and a negative electrode tab 21 each extends from an end of the current collector of each electrode of the electrode stack. FIG. 1 shows the state before tab convergence, and the convergence portion is omitted.

The respective components will be described below.

<Positive Electrode and Negative Electrode>

In this embodiment, the positive electrode 10 and the negative electrode 20 each include a current collector including a metal porous body having pores that are continuous with each other (communicating pores).

The pores of each current collector are filled with an electrode material mixture (positive electrode material mixture or negative electrode material mixture) containing an electrode active material. This is an electrode material mixture filled region that is filled with the electrode material mixture. Conversely, the positive electrode tab 11 and the negative electrode tab 21 are electrode material mixture non-filled regions that are net respectively filled with the electrode material mixtures.

(Current Collector)

The current collector includes a metal porous body having pores that are continuous with each other. Having pores that are continuous with each other allows the pores to be filled with a positive electrode material mixture or a negative electrode material mixture containing an electrode active material, thereby increasing the amount of the electrode active material per unit area of the electrode layer. The form of the metal porous body is not limited as long as it has pores that are continuous with each other. Examples of the form of the metal porous body include a foam metal having pores by foaming, a metal mesh, an expanded metal, a punching metal, and a metal nonwoven fabric.

The metal used in the metal porous body is not limited as long as it has electric conductivity. Examples thereof include nickel, aluminum, stainless steel, titanium, copper, and silver. Among these, as the current collector constituting the positive electrode, a foamed aluminum, foamed nickel, and foamed stainless steel are preferable. As the current collector constituting the negative electrode, a foamed copper and foamed stainless steel are preferable.

By using the current collector including the metal porous body, the amount of the active material per unit area of the electrode car, be increased, and as a result, the volumetric energy density of the lithium ion secondary battery can be improved. In addition, since the positive electrode material mixture and the negative electrode material mixture are easily fixed, it is not necessary to thicken a coating slurry for forming the electrode material mixture layer when the electrode material mixture layer is thickened, unlike a conventional electrode including a metal foil as a current collector. Accordingly, it is possible to reduce a binder such as an organic polymer compound that has been necessary for thickening. Therefore, the capacity per unit area of the electrode can be increased, and a higher capacity of the lithium ion secondary battery can be achieved.

(Electrode Material Mixture)

The positive electrode material mixture and the negative electrode material mixture are respectively disposed in the pores formed within the current collectors. The positive electrode material mixture and the negative electrode material mixture respectively contain a positive electrode active material and a negative electrode active material as an essential component.

(Electrode Active Material)

The positive electrode active material is not limited as long as it can occlude and release lithium ions. Examples thereof include $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.06})O_2$, $Li(Ni_{1/6}Co_{4/6}Mn_{1/6})O_2$, $Li(Ni_{1/3}Co_{1/3}Mn_{1/3})O_2$, $Li(Ni_{1/3}CO_{1/3}Mn_{1/3})O_2$, $LiCoO_4$, $LiMn_2O_4$, $LiNiO_2$, $LiFePO_4$, lithium sulfide, and sulfur.

The negative electrode active material is not limited as long as it can occlude and release lithium ions. Examples thereof include metallic lithium, lithium material mixtures, metal oxides, metal sulfides, metal nitrides, Si, SiO, and carbon materials such as artificial graphite, natural graphite, hard carbon, and soft carbon.

(Other Components)

The electrode material mixture may optionally include components other than an electrode active material and ionic conductive particles. The other components are not limited, and can be any components that can be used in fabricating a lithium ion secondary battery. Examples thereof include a conductivity aid and a binder. The conductivity aid of the positive electrode is, for example, acetylene black, and the binder of the positive electrode is, for example, polyvinylidene fluoride. Examples of the binder of the negative electrode include sodium carboxyl methyl cellulose, styrene-butadiene rubber, and sodium polyacrylate.

(Method for Manufacturing Positive Electrode and Negative Electrode)

The positive electrode 10 and the negative electrode 20 are each obtained by filling pores that are continuous with each other of a metal porous body as a current collector with an electrode material mixture. First, an electrode active material and, if necessary, a binder and a conductivity aid, are uniformly mixed by a conventionally known method, and thus an electrode material mixture composition adjusted to a predetermined viscosity, preferably in the form of a paste, is obtained.

Subsequently, pores of a metal porous body, which is a current collector, are filled with the above electrode material mixture composition as an electrode material mixture. The method of filling the current collector with the electrode material mixture is not limited, and is, for example, a method of filling the pores of the current collector with a slurry containing the electrode material mixture by applying pressure using a plunger-type die coater. As an alternative, the interior of the metal porous body may be impregnated with an ion conductor layer by a dipping method.

<Solid Electrolyte Layer>

As shown in FIG. 1, in the present invention, a first solid electrolyte layer 30 including an electrolyte that fills pores of a resin porous body is formed between the positive electrode 10 and the negative electrode 20.

The solid electrolyte constituting the first solid electrolyte layer 30 is not limited, and is, for example, a sulfide solid electrolyte material, an oxide solid electrolyte material, a nitride solid electrolyte material, or a halide solid electrolyte material. Examples of the sulfide solid electrolyte material include LPS halogens (Cl, Br, and I), $Li_2S$—$P_2S_5$, and $Li_2S$—$P_2S_5$—LiI for lithium ion batteries. The above-described "$L_2S$—$P_2S_5$" refers to a sulfide solid electrolyte material including a raw material composition containing $Li_2S$ and $P_2S_5$, and the same applies to the $P_2S_5$—LiI. Examples of the oxide solid electrolyte material include NASICON-type oxides, garnet-type oxides, and perovskite-type oxides for lithium ion batteries. Examples of the NASICON-type oxides include oxides containing Li, Al, Ti, P, and O (e.g., $Li_{1.5}Al_{0.5}Ti_{1.5}(PO_4)_3$). Examples of the garnet-type oxides include oxides containing Li, La, Zr, and O (e.g., $Li_7La_3Zr_2O_{12}$). Examples of the perovskite-type oxides include oxides containing Li, La, Ti, and o (e.g., $LiLaTiO_8$).

The same material as described above can be used for a second solid electrolyte layer 17 that fills pores of a metal porous body 15, which is described later.

<Resin Porous Body>

In the present invention, as the first solid electrolyte layer 30, pores of a resin porous body are filled with a solid electrolyte. The stacking of the metal porous body of the electrode and the resin porous body allows the two to intertwine with each other and increases their adhesion. Thus, it is possible to follow volume changes during charging and discharging.

The resin porous body is composed of a resin porous body having pores that are continuous with each other. Having pores that are continuous with each other allows the pores to be continuously filled with a solid electrolyte. The form of the resin porous body is not limited as long as it has pores that are continuous with each other. Examples of the form of the resin porous body include a foam resin having pores by foaming, a resin mesh, and a resin nonwoven fabric.

The resin used for the resin porous body is not limited. Examples thereof include olefinic resins such as polypropylene and polyethylene and copolymers thereof, and non-olefinic resins such as vinyl chloride, polystyrene, and elastomers and copolymers thereof. Among these, a hard resin is preferable, and a hard polypropylene resin is more preferable.

As a method of filling the pores of the resin porous body with the solid electrolyte, the same method as the above-described method of filling the pores of the metal porous body with the electrode material mixture can be used.

<Structure of Battery>

[First Embodiment]

The method for manufacturing the secondary battery of the first embodiment will be specifically described with reference to FIG. 2. FIG. 2 is a process diagram showing an example of the method for manufacturing the secondary battery of the present invention.

Figure 2B:
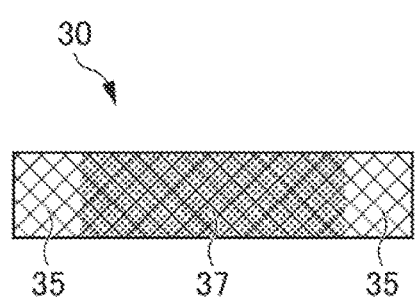
FIG. 2B is a process diagram of the manufacturing method of the first embodiment.
Figure 2A:
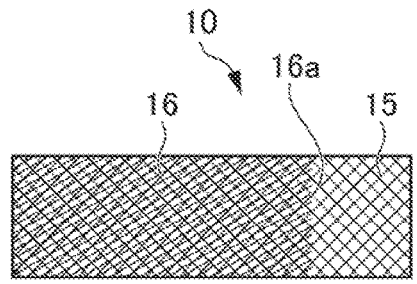
FIG. 2A is a process diagram of the manufacturing method of the first embodiment.

As shown in FIG. 2A, the positive electrode 20 includes a planar electrode current collector including the metal porous body 15 and an electrode material mixture layer (positive electrode material mixture layer) 16 including an electrode material mixture that fills pores of the metal porous body 15. Since the negative electrode 20 can be configured in the same manner, only reference numerals in parentheses are added to the drawing and the description thereof is omitted.

In this embodiment, the positive electrode 10 has an electrode material mixture layer 16, which forms an electrode material mixture filled region, from, one side in the longitudinal direction of the metal porous body 15 to an end edge 16a, and an electrode material mixture non-filled region in which only the metal porous body 15 is present from the end edge 16a to the other side of the metal porous body 15. The material mixture non-filled region is extended to form a positive electrode tab 11 (not shown in FIG. 2).

As shown in FIG. 2B, the first solid electrolyte layer 30 includes a planar body including a resin porous body 35 and a solid electrolyte 37 that fills pores of the resin porous body 35. In this embodiment, a solid electrolyte 37 filled region is formed in a substantially central region excluding both end portions in the longitudinal direction of the resin porous body 35 (the left and right end portions in FIG. 2B). On both sides of the solid electrolyte 37 filled region, electrolyte non-filled regions consisting only of the resin porous body 35 are present.

Figure 2C:
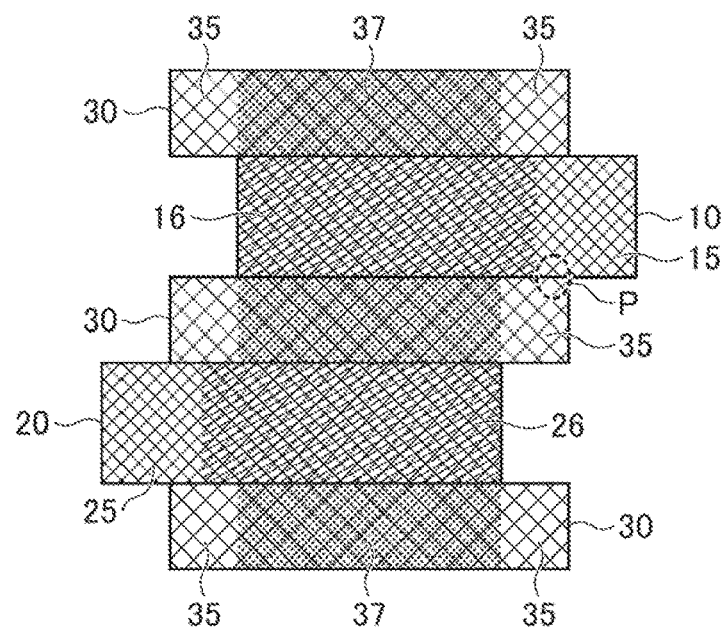
FIG. 2C is a process diagram of the manufacturing method of the first embodiment.

Thereafter, as shown in FIG. 2C, the solid electrolyte layer 30, the positive electrode 10, the solid electrolyte layer 30, and the negative electrode 20 are stacked, and they are repeatedly stacked to form the lithium ion secondary battery 100 shown in FIG. 1. At this time, the surface irregularities of the metal porous body 15 and the surface irregularities of the resin porous body 35 are engaged and partially intertwined with each other, which improves the adhesion between the layers and makes it difficult for them to delaminate. Thus, it is possible to follow volume changes during charging and discharging.

Figure 2D:
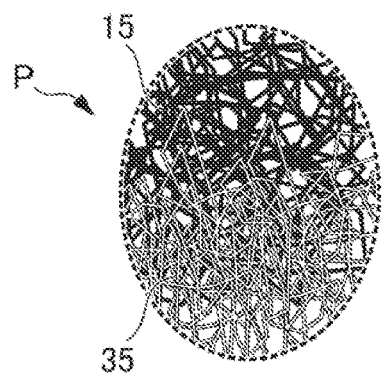
FIG. 2D is a process diagram of the manufacturing method of the first embodiment.

FIG. 2D is an enlarged view of the bonding location P in FIG. 2C, and is a schematic diagram showing that the surface irregularities of the metal porous body 15 in the electrode material mixture non-filled region and the surface irregularities of the resin porous body 35 in the electrolyte non-filled region face each other and are intertwined with each other. This further strengthens the bonding between the electrode and the first solid electrolyte layer 30, thereby suppressing electrodeposition of lithium. It is preferable that the bonding location P is pressure-bonded by pressing or the like.

[Second Embodiment]

FIG. 3 shows a second embodiment of the present invention, in which the structure of a solid electrolyte layer 30 is the same as that of the first embodiment, but the structure of a positive electrode 10a differs from that of the first embodiment. The positive electrode 10a in FIG. 3A includes a planar electrode current collector including a metal porous body 15, an electrode material mixture layer (positive electrode material mixture layer) 16 including an electrode material mixture that fills pores of the metal porous body 15, and a second solid electrolyte layer 17 including a solid electrolyte that fills pores of the metal porous body 15. The electrode material mixture layer 16 and the second solid electrolyte layer 17 are stacked in a planar shape in the pores of the metal porous body 15. In FIG. 3A, the electrode material mixture layer 16 is formed above in a Z direction, and the second solid electrolyte layer 17 is formed below in the Z direction.

The term "planar" in the present invention means that the metal porous body 15 is a planar body having an XY plane in FIG. 1 and a predetermined thickness in a Z direction. The term "stacked in a planar shape" means that the electrode material mixture layer 16 and the second solid electrolyte layer 17 are stacked one above the other (in the Z direction) in pores of the metal porous body 15.

The positive electrode 10*a* can be obtained, for example, by coating the electrode material mixture layer 16 and the second solid electrolyte layer 17 with a predetermined viscosity from the front and back sides of the metal porous body 15, respectively, i.e., applying them separately on the upper and lower sides. By filling the pores of the metal porous body 15 having a network structure with each of the layers, it is possible to obtain an electrode that follows volume changes during charging and discharging using the elasticity of the metal porous body 15, and thereby suppress electrodeposition of lithium.

Figure 3A:
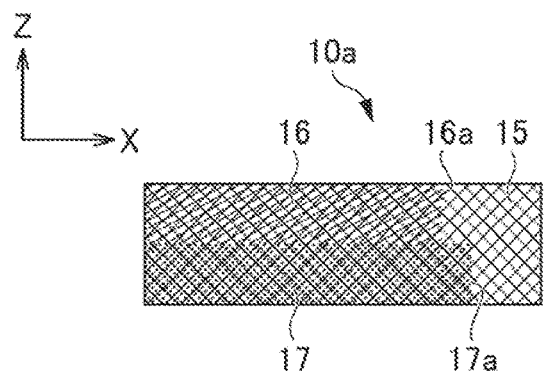
FIG. 3A is a process diagram of the manufacturing method of a second embodiment.

As shown in FIG. 3A, in the cross-sectional view, an end edge 17*a* of the second solid electrolyte layer 17 in the direction of a tab is at a position extending beyond an end edge 16*a* of the electrode material mixture layer 16 in the direction of the tab. In other words, in plan view, at least the end edge 17*a* of the solid electrolyte layer in the direction of the tab is located beyond the end edge 16*a* of the electrode material mixture layer in the direction of the tab. This effectively prevents breakage of the tab as a current collector. In addition, since the ion path is expanded, charge-discharge stability (e.g., improvement of cycle characteristics) is improved by suppressing charge concentration at the edges. As shown in FIG. 3A, the end edge 17*a* only needs to extend beyond the position of the end edge 16*a*, and for example, the end edge 17*a* may be configured to cover the end edge 16*a*.

Figure 3C:
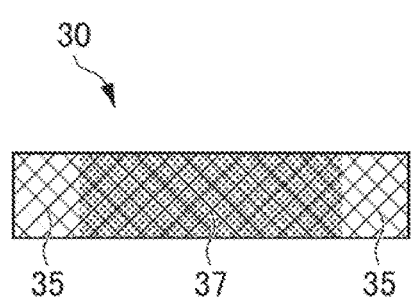
FIG. 3C is a process diagram of the manufacturing method of the second embodiment.
Figure 3B:
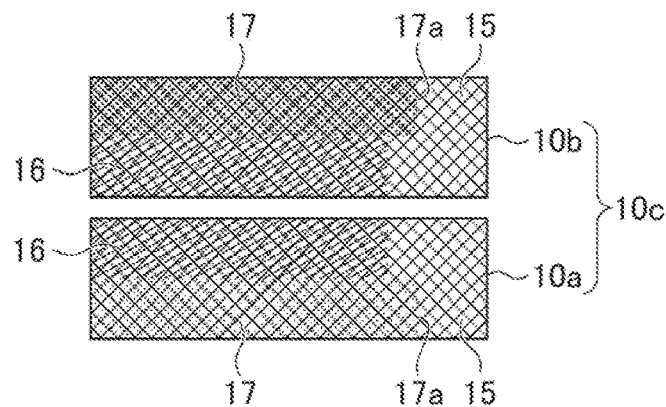
FIG. 3B is a process diagram of the manufacturing method of the second embodiment.

In this embodiment, as shown in FIG. 3B, the electrode 10*a* and an electrode 10*b* that are identical to each other are bonded together by pressing or the like so that the electrode material mixture layers 16 face each other, to construct a positive electrode 10*c*. The structure of bonding together a pair of identical electrodes can improve the energy density, which is preferable.

A first solid electrolyte layer 30 shown in FIG. 3C is the same as that of the first embodiment described above, so the description thereof is omitted.

Figure 3D:
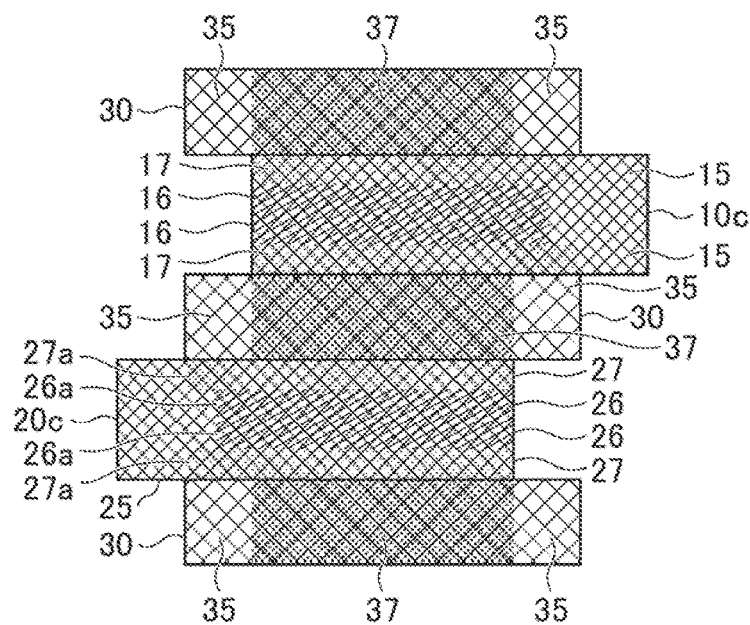
FIG. 3D is a process diagram of the manufacturing method of the second embodiment.

Finally, as shown in FIG. 3D, the first solid electrolyte layer 30, the positive electrode 10*c*, the first solid electrolyte layer 30, a negative electrode 20*c*, and the first solid electrolyte layer 30 are stacked. In this manner, the lithium ion secondary battery 100 in FIG. 1 can be obtained by stacking the positive electrode and the negative electrode via the first solid electrolyte layer 30 that is independent and separate. In the negative electrode 20*c*, as in the positive electrode 10*c*, an electrode material mixture layer (negative electrode material mixture layer) 26 and a second solid electrolyte layer 27 (identical to the second solid electrolyte layer 17) are stacked one above the other in pores of a metal porous body 25. By adhering the second solid electrolyte layer 17 (or 27) and the first solid electrolyte layer 30 that are adjacent to each other, the interface is formed in a stable manner, which is expected to improve ionic conductivity and lower resistance.

[Modification of First Embodiment]

Figure 4:
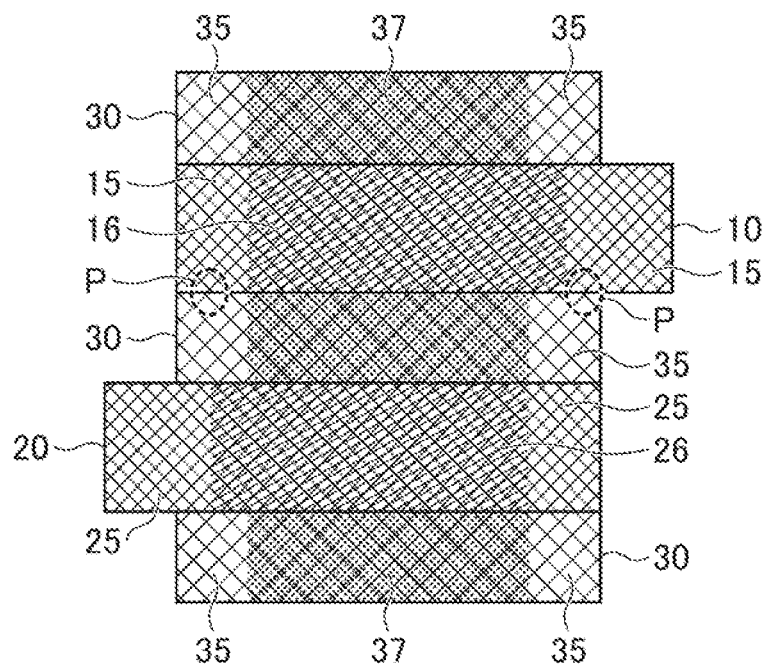
FIG. 4 is a cross-sectional schematic diagram of a modification.

FIG. 4 differs from FIG. 2C in that the electrode material mixture non-filled region (region with only the metal porous body) is present at both end portions of each of the positive electrode 10 and the negative electrode 20, not at an end portion thereof. As a result, two bonding locations P are formed on both sides of the electrode material mixture layer and the first solid electrolyte layer. This is preferable because the electrode material mixture layer and the first solid electrolyte layer are bonded together more firmly.

Although preferred embodiments of the present invention have been described above, the present invention is not limited to the above embodiments and can be modified as appropriate.

EXPLANATION OF REFERENCE NUMERALS 10 positive electrode
10*a* positive electrode
10*b* positive electrode
10*c* positive electrode
11 positive electrode tab
15 metal porous body (positive electrode)
16 electrode material mixture (positive electrode material mixture)
16*a* end edge
17 second solid electrolyte layer (positive electrode)
17*a* end edge
20 negative electrode
20*c* negative electrode
21 negative electrode tab
25 metal porous body (negative electrode)
26 electrode material mixture (negative electrode material mixture)
26*a* end edge
27 second solid electrolyte layer (negative electrode)
27*a* end edge
30 first solid electrolyte layer
35 resin porous body
37 solid electrolyte
100 lithium ion secondary battery

What is claimed is:

1. A secondary battery, comprising:
a positive electrode comprising an electrode material mixture that fills pores of a metal porous body constituting an electrode current collector;
a first solid electrolyte layer comprising a solid electrolyte that fills pores of a resin porous body; and
a negative electrode comprising an electrode material mixture that fills pores of a metal porous body constituting an electrode current collector,
wherein the positive electrode and the negative electrode are alternately stacked with the first solid electrolyte layer provided therebetween,
wherein an electrode material mixture layer and a second solid electrolyte layer are stacked in a planar shape in the pores of the metal porous body,
wherein the first solid electrolyte layer and the second solid electrolyte layer are stacked facing each other,
wherein a positive electrode tab extends from an end of the electrode current collector of the positive electrode and a negative electrode tab extends from an end of the electrode current collector of the negative electrode, and
wherein, in plan view, an end edge of the second solid electrolyte layer in a direction of the tab is located beyond an end edge of the electrode material mixture layer in the direction of the tab.

2. The secondary battery according to claim 1,
wherein at least one of the positive electrode current collector or the negative electrode current collector has an end portion having an electrode material mixture non-filled region that is not filled with the electrode material mixture,
wherein the first solid electrolyte layer has an end portion having an electrolyte non-filled region that is not filled with the solid electrolyte, and
wherein the electrode material mixture non-filled region and the electrolyte non-filled region face each other and are intertwined with each other.

3. The secondary battery according to claim 2, wherein the electrode material mixture non-filled region and the electrolyte non-filled region are pressure-bonded.

* * * * *